United States Patent [19]

Ahner et al.

[11] Patent Number: 4,765,132
[45] Date of Patent: Aug. 23, 1988

[54] PROCESS FOR COMBUSTION OF A FUEL CONTAINING SULFUR THROUGH THE USE OF A GAS TURBINE

[75] Inventors: David J. Ahner, Ballston Lake; Richard C. Sheldon, Schenectady; Joseph J. Oliva, Rexford, all of N.Y.

[73] Assignee: General Electric Company, New York, N.Y.

[21] Appl. No.: 713,776

[22] Filed: Mar. 19, 1985

[51] Int. Cl.⁴ ............................................. F02C 3/28
[52] U.S. Cl. ................................. 60/39.02; 60/39.12; 55/73
[58] Field of Search ................. 60/39.02, 39.12; 55/73

[56] References Cited

U.S. PATENT DOCUMENTS

| | | |
|---|---|---|
| 2,992,065 | 7/1961 | Feustel et al. . |
| 3,436,192 | 4/1969 | Karlsson . |
| 3,607,034 | 9/1971 | Henry et al. . |
| 4,048,286 | 9/1977 | Rossmaier ............................. 55/73 |
| 4,153,410 | 5/1979 | Diem et al. . |
| 4,285,917 | 8/1981 | Knight . |
| 4,331,630 | 5/1982 | Van Pool . |
| 4,566,267 | 1/1986 | Muller et al. ..................... 60/39.12 |

FOREIGN PATENT DOCUMENTS

| | | |
|---|---|---|
| 709640 | 6/1954 | United Kingdom . |
| 2097476 | 11/1982 | United Kingdom ............... 60/39.02 |

*Primary Examiner*—Louis J. Casaregola
*Attorney, Agent, or Firm*—Lyon & Lyon

[57] ABSTRACT

A process for combusting fuel containing sulfur through the use of a gas turbine to generate electricity wherein a tail gas from a sulfur treatment process containing carbon dioxide and contaminants containing sulfur is passed to the combustor of the gas turbine or a supplemental firing unit to combust the contaminants.

12 Claims, 1 Drawing Sheet

PROCESS FOR COMBUSTION OF A FUEL CONTAINING SULFUR THROUGH THE USE OF A GAS TURBINE

BACKGROUND OF THE INVENTION

The field of the present invention relates generally to a process for combusting a fuel containing sulfur to generate electricity through a gas turbine.

A gas turbine will combust a fuel and a compressed working gas, usually air, in a combustor to form a combusted stream which is expanded in a turbine to generate electricity. The fuel will typically be a hydrocarbon which contains carbon and hydrogen which are combusted with oxygen from the working gas by exothermic reactions to produce carbon dioxide and water, respectively. An example of one suitable fuel is natural gas. When the fuel to be used in a gas turbine contains sulfur, the fuel must be treated for sulfur removal prior to combustion to avoid pollution and corrosive problems associated with the sulfur.

In a typical sulfur treatment process, the fuel will be treated to form a sour gas stream and a purified fuel gas stream containing substantially no sulfur or sulfur compounds. The sour gas may then be treated to recover sulfur and a waste tail gas composed of carbon dioxide and trace amounts of contaminants such as hydrogen sulfide ($H_2S$) and carbonyl sulfide (COS). Because of pollution concerns, these compounds must normally be removed from the carbon dioxide before release to the atmosphere. Such removal may be accomplished by combusting the compounds with oxygen to form sulfur dioxide in an incinerator which is released through a smokestack to the environment. However, such combustion requires a fuel source to raise the temperature of the tail gas containing carbon dioxide to a level which will insure combustion of the sulfur compounds.

In a conventional process for combusting a fuel containing sulfur, a small stream of purified fuel gas will be diverted to the incinerator to combust the contaminant sulfur compounds. Since this diversion stream of purified fuel gas is not being used to produce electricity or work in the gas turbine, it is effectively "lost" and therefore reduces the overall efficiency of the power cycle.

One process for treatment of tail gas containing hydrogen sulfide is described in U.S. Pat. No. 4,331,630 to Van Pool. This process describes the combination of the fuel gas and the tail gas before they are introduced to the incinerator to accomplish acceptable combustion at a substantially lower stack temperature than previous processes. While this process substantially lowers the amount of fuel "lost" to sulfur pollution abatement, it still requires the use of fuel in the incinerator.

Accordingly, there exists a need for a process for combusting fuel containing sulfur, wherein the amount of clean fuel "lost" to pollution abatement is reduced, thereby increasing the overall efficiency of electricity generation from fuels containing sulfur. This need is especially acute for fuels containing a large amount of sulfur which require a correspondingly larger amount of "lost" fuel to incinerate the increased sulfur contaminants in the tail gas.

SUMMARY OF THE INVENTION

In the present invention, fuels containing sulfur are subjected to a sulfur treatment process to separate a purified fuel gas stream from a tail gas containing sulfur contaminants which are subsequently combusted in a combustor of a gas turbine with the purified fuel gas stream. In another aspect of the present invention, the contaminants may also be burned in a supplemental firing unit used in connection with the gas turbine.

When a fuel containing sulfur is used to generate electricity through a gas turbine in accordance with the present invention, the overall efficiency of electrical generation is increased, especially for fuels with a high sulfur content, because no fuel is "lost" to an incinerator to combust the sulfur contaminants. In addition, the exothermic combustion of the sulfur contaminants is actually utilized to help increase electrical generation of the gas turbine or increase the temperature of a waste heat stream associated with the gas turbine to thereby help increase overall efficiency. Further, since incineration of the tail gas is no longer required, capital costs associated with an incinerator are no longer required.

Accordingly, it is a primary object of the present invention to provide an improved process for generating electricity from fuels containing sulfur.

This and further objects and advantages will be apparent to those skilled in the art in connection with the drawings and detailed description of the preferred embodiments set forth below.

DESCRIPTION OF THE PREFERRED EMBODIMENTS

It has been found that the present invention is particularly well suited for use in a process for combusting gasified coal containing sulfur through the use of a gas turbine. Accordingly, while the preferred embodiments will be described in connection with the use of gasified coal, one skilled in the art will recognize that the processes described herein may also be used with the combustion of other fuels containing sulfur in connection with the use of a gas turbine.

Figure 1:
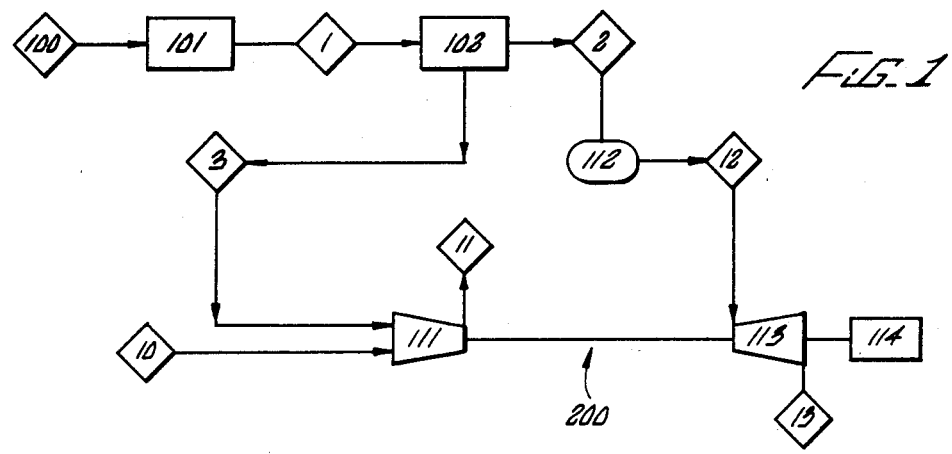
FIG. 1 is a schematic drawing of a process according to the present invention.
Figure 2:
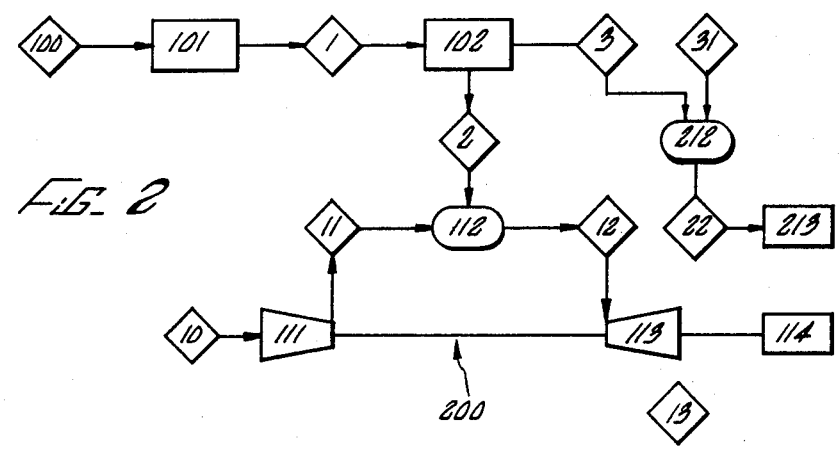
FIG. 2 is a schematic drawing of another process according to the present invention.
Figure 3:
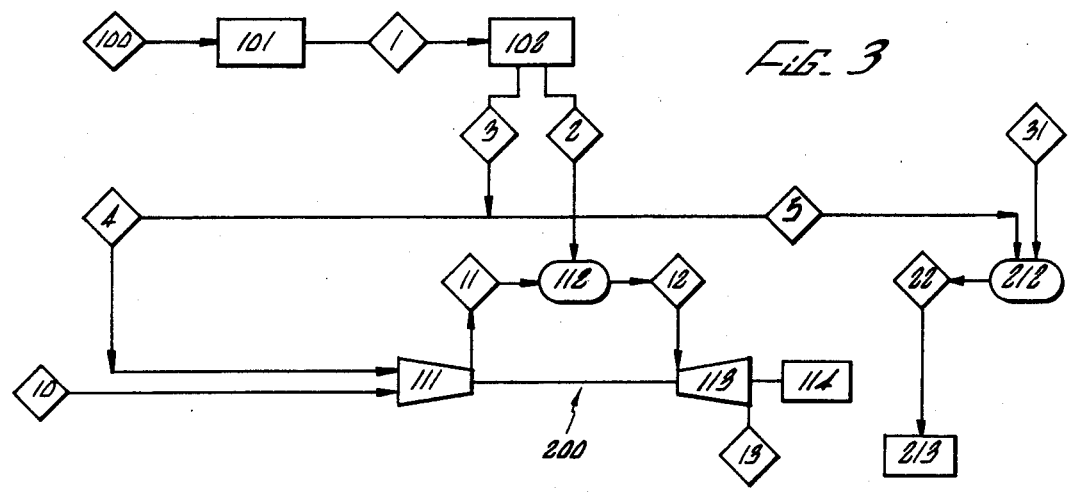
FIG. 3 is a schematic drawing of still another process according to the present invention.

Three preferred processes according to the present invention are described in FIGS. 1 through 3 in which a stream of coal 100 is passed to a coal gasification unit 101 to gasify the coal 100. After gasification, the gas 1 is passed to a sulfur treatment unit 102 which removes sulfur (not shown) from the gas 1 to produce a purified fuel gas stream 2 and a tail gas stream 3 comprising carbon dioxide and contaminants containing sulfur such as carbonyl sulfide and hydrogen sulfide. The processes of the coal gasification unit 101 and the sulfur treatment unit 102 are not narrowly critical and are deemed to be within the skill of one in the art.

In the process depicted in FIG. 1, the purified fuel gas 2 is passed to a combustor 112 of a gas turbine, generally depicted as 200. The tail gas stream 3 and a working gas 10 are passed into the compressor 111 of the gas turbine 200 where they are compressed into a compressed stream 11 which is passed into the combustor 112. The working gas 10 will contain sufficient oxygen so as to create a stoichiometric excess of oxygen in the combustor 112. The purified fuel gas stream 2 and the contaminants containing sulfur are combusted in the combustor 112 with a stoichiometric excess of oxygen to form a combusted stream 12 which is passed to the turbine 113 of the gas turbine 200 where it is expanded to form an expanded stream 13 and thereby generate power to drive the compressor 111 and generate electricity in the generator 114.

In the process depicted in FIG. 2, the tail gas stream 3 is passed to a supplemental firing unit 212 with a supplemental fuel stream 31 instead of being passed to the compressor 111. The purified fuel gas stream 2 is still passed to the combustor 112 as in the process depicted in FIG. 1. The contaminants containing sulfur and the supplemental fuel stream 31 are combusted in the supplemental firing unit 212 to form a heated supplemental stream 22 which is passed to an energy generating means 213. The heated supplemental stream 22 may optionally be combined with the expanded stream 13 to form a waste heat stream which is then passed to an energy generating means or waste heat recovery system. The energy generating means 213 may be a steam generator, waste heat boiler, or other heat recovery device. Additionally, if pressurized, the supplemental stream 3 could be passed to the combustor 112 for use in the gas turbine 200.

In the process depicted in FIG. 3, the tail gas stream 3 is split into a first stream of tail gas 4 and a second stream of tail gas 5. The first stream of tail gas 4 is passed to the compressor 111 while the second stream of tail gas 5 is passed to the supplemental firing unit 212. The remainder of the process combines the steps of the processes depicted in FIGS. 1 and 2.

From the processes depicted in FIGS. 1 through 3, it is apparent that the tail gas stream 3 can be combusted in a combustion unit which may comprise the combustor 112, the supplemental firing unit 212 or both the combustor 112 and the supplemental firing unit 212. However, unlike the prior art, such combustion will not be "lost" in that the combustion will be utilized in connection with the generation of energy through the use of a gas turbine. Thus, the combustion will produce a contaminant combusted stream which will effectively be passed to an energy generating means in that it will contribute to the elevated temperature of the combusted stream 12 or the heated supplemental stream 22. Either use of the contaminant combusted stream will contribute to increasing the efficiency of the steam generator 200. Of course, the increased efficiency will depend upon several parameters, including the amount of tail gas produced per unit of fuel. However, based upon theoretical calculations using coal as a fuel source, it is estimated that overall energy savings on the order of approximately 0.5 to approximately 1.0% may result from the combustion of the contaminants containing sulfur in the combustor 112 and/or the supplemental firing unit 212 as compared to prior art processes which would combust the contaminants with a portion of the purified fuel gas stream 2 in a separate incinerator.

Having fully described the present invention, it will be apparent from the above description and drawings that various modifications may be made within the scope of the invention. Therefore, the invention is not intended to be limited except as may be required by the lawful scope of the following claims.

What is claimed is:

1. A process for combusting a fuel containing sulfur through the use of a gas turbine, said process comprising the steps of:
    subjecting the fuel to a sulfur treatment process;
    separating a purified fuel gas stream and a tail gas comprising carbon dioxide and a contaminant containing sulfur;
    passing the purified fuel gas stream to a combustor of the gas turbine;
    passing a working gas into a compressor of the gas turbine;
    passing a stream of the tail gas into the compressor;
    compressing the working gas and the tail gas into a compressed stream in the compressor of the gas turbine;
    passing the compressed stream into the combustor;
    combusting the purified fuel gas stream and the contaminant in the combustor to form a combusted stream; and
    passing the combusted stream to a turbine of the gas turbine wherein the combusted stream is expanded to form an expanded stream.

2. A process as recited in claim 1 wherein the fuel is coal which is gasified before it is subjected to the sulfur treatment process.

3. A process as recited in claim 1 wherein the stream of tail gas passed into the compressor is comprised of substantially all of the tail gas separated from the purified fuel gas stream.

4. A process as recited in claim 1 further comprising the steps of:
    passing a supplemental fuel stream to a supplemental firing unit;
    passing a second stream of the tail gas into the supplemental firing unit;
    combusting the supplemental fuel stream and the contaminant in the supplemental firing unit to form a heated supplemental stream; and
    passing the heated supplemental stream to an energy generating means.

5. A process as recited in claim 4 wherein the energy generating means comprises a steam generator.

6. A process as recited in claim 4 wherein the heated supplemental stream is passed into the compressor of the gas turbine.

7. A process as recited in claim 4 wherein the energy generating means comprises a waste heat boiler.

8. A process as recited in claim 4 wherein the energy generating means comprises a heat recovery device.

9. A process as recited in claim 4 wherein the heated supplemental stream is combined with the expanded stream to form a waste heat stream.

10. A process as recited in claim 9 wherein the waste heat stream is passed to a stream generator.

11. A process as recited in claim 9 wherein the waste heat stream is passed to a waste heat boiler.

12. A process as recited in claim 9 wherein the waste heat stream is passed to a heat recovery device.

* * * * *